(12) United States Patent
Rinehart

(10) Patent No.: US 8,341,879 B1
(45) Date of Patent: Jan. 1, 2013

(54) MODIFIED PLANT SUPPORTING STRUCTURE

(76) Inventor: Denny Rinehart, Cairo, WV (US)

( * ) Notice: Subject to any disclaimer, the term of this patent is extended or adjusted under 35 U.S.C. 154(b) by 0 days.

(21) Appl. No.: 13/280,612

(22) Filed: Oct. 25, 2011

(51) Int. Cl.
*A01G 17/04* (2006.01)

(52) U.S. Cl. .......................................................... 47/45

(58) Field of Classification Search ............... 47/44, 45, 47/47, 75, 78
See application file for complete search history.

(56) References Cited

U.S. PATENT DOCUMENTS

| | | | |
|---|---|---|---|
| 2,181,016 A | 11/1939 | Gross | |
| 2,492,152 A * | 12/1949 | Hollowell | 47/80 |
| 3,088,245 A | 5/1963 | Menge | |
| 3,113,400 A | 12/1963 | Emond | |
| 4,073,091 A | 2/1978 | Vogel | |
| 4,285,163 A | 8/1981 | Booker, Jr. | |
| 4,372,351 A | 2/1983 | Myers | |
| 4,667,438 A | 5/1987 | Corell | |
| 4,841,670 A | 6/1989 | Bitter | |
| 4,858,380 A | 8/1989 | Gayle | |
| 4,894,951 A | 1/1990 | Risley | |
| 5,174,060 A | 12/1992 | Glamos | |
| 5,179,799 A | 1/1993 | Hillestad | |
| 5,301,463 A * | 4/1994 | Domurat | 47/41.01 |
| 5,544,446 A | 8/1996 | Benson, Jr. | |
| 5,848,522 A * | 12/1998 | Coviello, Jr. | 56/329 |
| 5,924,657 A * | 7/1999 | Bach | 248/97 |
| 6,385,901 B1 | 5/2002 | Wahlberg | |
| 6,412,740 B1 * | 7/2002 | Rush et al. | 248/312.1 |
| 6,874,276 B2 | 4/2005 | Morrison | |
| D542,611 S | 5/2007 | Wilson | |
| 7,296,773 B2 * | 11/2007 | Yang | 248/311.2 |
| 7,555,862 B2 * | 7/2009 | Li | 47/31 |
| D604,528 S | 11/2009 | Hiatt | |
| 7,707,769 B1 * | 5/2010 | Courter | 47/41.12 |
| 2003/0066233 A1 * | 4/2003 | Gunderman et al. | 47/45 |
| 2004/0237393 A1 | 12/2004 | Morrison | |
| 2005/0076562 A1 * | 4/2005 | Huang | 47/44 |
| 2006/0185231 A1 * | 8/2006 | Barrett | 47/41.11 |
| 2011/0265375 A1 * | 11/2011 | Piccolomini | 47/45 |

FOREIGN PATENT DOCUMENTS

WO    WO 8707817 A1 * 12/1987 ................ 47/45

OTHER PUBLICATIONS

Garden Harvest Supply, Inc., Tomato Cages, Oct. 25, 2011, http://www.gardenharvestsupply.com/Productcart/pc/Tomato-Cages-c35.htm, pp. 1-2.
Plantive Plant Support Co., Plant Supports, Oct. 25, 2011, http://plantsupports.org/plant-support/, pp. 1-2.

* cited by examiner

*Primary Examiner* — Frank T Palo
(74) *Attorney, Agent, or Firm* — Waters Law Group; Robert R. Waters; Brian W. Foxworthy

(57) ABSTRACT

The present invention is a plant supporting structure that provides effective support to a fruit bearing plant. It consists of two courses of rings that are vertically spaced. The rings in the outer course form an enclosure within which the rings from the inner course may be placed. The rings are held in place by spines. Each spine ascends vertically, successively connecting the rings of the outer course, and then descends vertically, connecting the rings of the inner course. The spines are spaced around the circumference of the rings. In some embodiments, the bottom ring of the outer course has the largest diameter of all the rings. In such embodiments, the bottom ring may sit on the ground or other plant growing surface and support the entire structure. The outer bottom ring may be lower than the inner bottom ring, thus preventing the fruits from touching the ground.

7 Claims, 5 Drawing Sheets

MODIFIED PLANT SUPPORTING STRUCTURE

BACKGROUND OF THE INVENTION (a) Technical Field of the Invention

This invention generally relates to plant supporting structures, particularly directed to vine-type plants. In vine-type plants, such as tomatoes and grapes, the fruits are typically heavier than the plant itself, thus making the entire plant unsteady. These plants therefore require some physical structure that will support the fruits, keep them spaced apart so as to provide sufficient room to grow, allow sunlight to reach its different parts, provide adequate air flow, and also be able to hold steady during strong winds and rain. Another important consideration is to keep the plants and fruits off the ground so as to keep them free from bugs and insects, and to keep them clean.

In the past, stakes have been used, to which the plant has been tied for support. In such cases, the stakes are typically unsteady and provide limited support. As a result, the plants' stems get broken; the fruits clump together and eventually may sag to the ground. Many plant supporting structures appear in the prior art that attempt to address one or more of these problems.

(b) Description of the Relevant Art

A considerable number of patents relate generally to tomato cage structures. These prior art structures take a variety of general shapes and forms.

In U.S. Pat. No. 5,179,799, Hillestad discloses a tomato plant support system that consists primarily of a series of horizontal rings connected by vertical risers. In that sense, it is similar to the current invention. However, a key component of the Hillestad system is the fact that each of the horizontal rings includes the formation of double open ended loops forming seats along the ring. Specifically, three seats are disposed around the perimeter of the ring. As with the present invention, the rings are of varying diameter. The open ended loops form seats that are used to connect the members together for assembly.

Another tomato cage is found in U.S. Pat. No. 6,874,276 B2 by Morrison. The Morrison tomato cage also consists of a series of horizontally displaced support rings and vertical risers connecting them. The concentric rings are arranged such that the rings with the smallest diameters are located at the bottom. However, the support legs terminate in a specific handle. In this structure, the handle is integral with the legs of the device so that when the Morrison device is forced into the ground, the force does not affect the concentric rings. Another published patent application by Morrison US 2004/0237393 A1, from Dec. 2, 2004, is directed to the same invention as the Morrison patent.

U.S. Pat. No. 4,372,351 by Myers is a method patent directed to a method of producing a particular style of wire basket that could be used to support a plant. The basket could also be used for other purposes as well. The method claims require the production of a plurality of wire loops that are then connected by concentric horizontally disposed rings, as best illustrated in FIG. 1 of the Myers' published patent.

U.S. Pat. No. 5,174,060 by Glamos is a variety of plant stand that is generally in the shape of a cone. The arrangement requires a primary helical coil support member, identified with the number 20 in FIGS. 1 and 2 of the published patent.

Another tomato cage structure is found in U.S. Pat. No. 4,858,380 by Gayle. However, the Gayle structure requires two separate independent enclosure structures. The larger of the two structures is a barrel-shaped cage of a specified diameter that sits on top of a smaller diameter support structure. The Gayle device requires a two piece construction.

Many of the prior art devices found are very old, as set forth in long expired patents. For example, U.S. Pat. No. 2,181,016 by W. F. Gross is a plant protection device essentially taking the form of a rounded glass cage. The Gross structure includes rounded glass side panels, which makes it unsuitable for the uses that have been established for this invention. Moreover, glass is heavy, expensive and fragile.

Many of the prior devices found consist of square or rectangular support structures and many other patents describe support stands that are designed to be quickly assembled and disassembled. For example, please note U.S. Pat. No. 3,113,400 by Emond, U.S. Pat. No. 4,073,091 by Vogel, U.S. Pat. No. 4,285,163 by Booker Jr., and U.S. Pat. No. 4,667,438 by Corell.

A review of the prior art reveals that an effective and stable plant supporting structure needs to provide a number of key functional improvements. Not only must the structure serve to keep the plant and its fruits off the ground, the structure must also be sturdy and provide effective support so that the plant may be protected even under adverse weather conditions, without the need to apply strings or rope directly to tie the plant, and generally lower maintenance as the plant grows and extends. The design of the structure should prevent from running the cultivator too close to plant roots. This structure should also provide excellent air circulation for the plant and improve the reception of sunlight. It should prevent crimped or partially broken plant stems that can prohibit natural plant fluid transfer, thereby causing disease and decay. Additionally, the structure should support multiple plants, keeping both the plants and the fruits off the ground. These and other key improvements are embodied in the present invention.

SUMMARY OF THE INVENTION

The present invention is a plant supporting structure that provides effective support to a fruit bearing plant. It consists of two courses of rings that are vertically spaced. The rings in the outer course form an enclosure within which the rings from the inner course may be placed. The rings are held in place by spines. Each spine ascends vertically, successively connecting the rings of the outer course, and then descends vertically, connecting the rings of the inner course. The spines are spaced around the circumference of the rings. In some embodiments, the bottom ring of the outer course has the largest diameter of all the rings. In such embodiments, the bottom ring may sit on the ground or other plant growing surface and support the entire structure. In some other embodiments, the spines may extend vertically beyond the bottom ring of the first course, and act as stakes to anchor the structure into the ground. The outer bottom ring may be lower than the inner bottom ring, thus preventing the fruits from touching the ground. The combination of the inner and outer course allows the plant to grow in its natural shape, keeps the plant well-ventilated, allows sunlight to reach different parts of the plant, keeps the plant and fruits away from the ground, and provides a stable support, both for continued growth and fruit-bearing, and also for stability during adverse weather conditions.

These and other features, variations and advantages which characterize this invention, will be apparent to those skilled in the art, from a reading of the following detailed description and a review of the associated drawings.

Additional features and advantages of this invention will be understood from the detailed descriptions provided. This description, however, is not meant to limit the embodiments, and merely serves the purpose of describing some structural embodiments.

BRIEF DESCRIPTION OF THE DRAWINGS

A better understanding of the present invention will be had upon reference to the following description in conjunction with the accompanying drawings, wherein.

DETAILED DESCRIPTION OF EMBODIMENTS

While the invention will be described in connection with certain embodiments, the description should not be construed to limit the invention to these embodiments. On the contrary, the intent is to cover all alternatives, modifications and equivalents as included within the spirit and scope of the invention. Various changes may be made to the function and arrangement of the elements described herein, without changing the scope of the invention being disclosed. It should be noted that the following description serves to teach at least one instance of how the various elements may be arranged to achieve the stated goals of this invention.

Figure 1A:
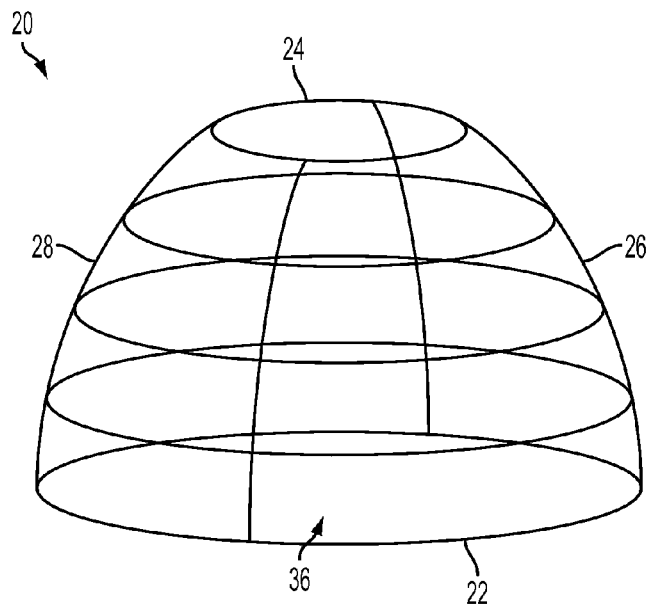
FIG. 1A shows an embodiment of the outer course of rings with spines.

Referring now to FIG. 1A, an outer course 20 of rings is shown here. The outer bottom ring 22 and the outer top ring 24 are shown, along with some intermediate rings. In the embodiment shown, the rings are substantially circular. Also shown is a spine 26 and a spine 28, both spines connecting the rings of the outer course 20. The rings are spaced vertically, and generally arranged concentrically. The spines 26 and 28 are also generally arranged concentrically along the perimeter of the rings. The outer course 20 forms an enclosure 36.

Figure 1B:
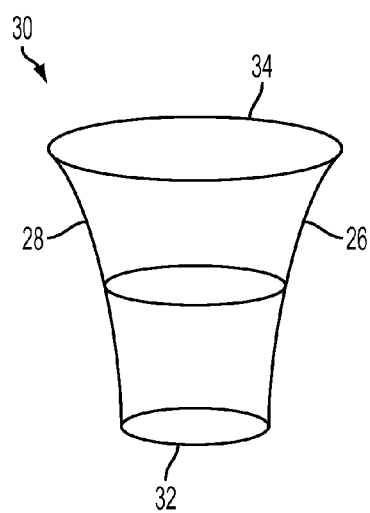
FIG. 1B shows an embodiment of the inner course of rings with spines.

Referring now to FIG. 1B, an inner course 30 of rings is shown here. The inner bottom ring 32 and the inner top ring 34 are shown, along with one or more intermediate rings. In the embodiment shown, the rings are substantially circular. Also shown is a spine 26 and a spine 28, both spines connecting the rings of the inner course. The rings are spaced vertically, and generally arranged concentrically. The spines 26 and 28 are also generally arranged concentrically along the perimeter of the rings.

Figure 1C:
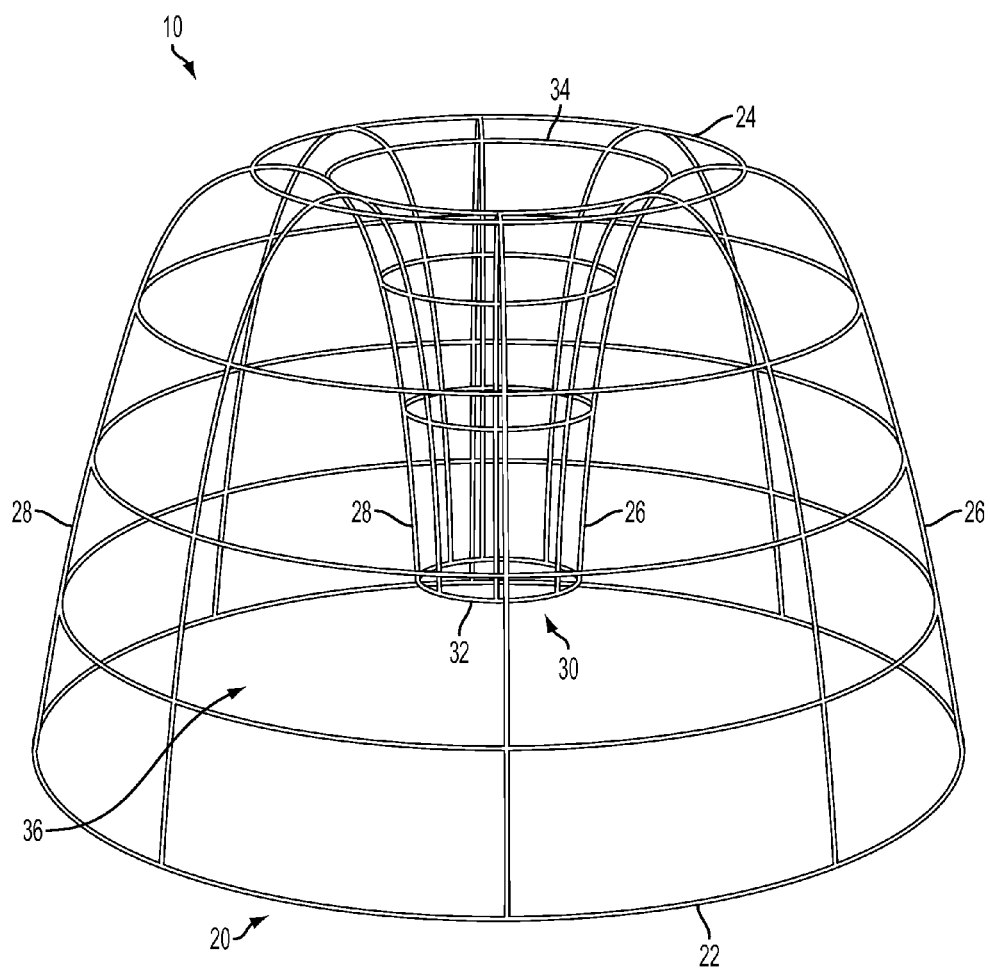
FIG. 1C is a frontal perspective view of an embodiment of the present invention showing the relative positions of the outer and inner courses, and the spines connecting all the rings in both courses, the rings being substantially circular.

Referring now to FIG. 1C, a frontal perspective view of an embodiment 10 of this invention is shown. The figure shows how an inner course 30 is disposed within the enclosure 36 formed by the outer course 20. The outer bottom ring 22 and the outer top ring 24 are shown, along with some intermediate rings. The rings are spaced vertically, and generally arranged concentrically. The inner bottom ring 32 and the inner top ring 34 are shown, along with one or more intermediate rings. The inner rings are also spaced vertically, and generally arranged concentrically. In some embodiments, these rings may be stacked vertically. Also shown are spine 26 and spine 28. The figure illustrates the manner in which spine 26 connects the rings by ascending vertically from the outer bottom ring 22 to the outer top ring 24, successively connecting each intermediate ring of the outer course 20. Thereafter, spine 26 descends from outer top ring 24 to inner top ring 34, and continues to descend vertically to inner bottom ring 32, successively connecting each intermediate ring of the inner course 30.

It should be noted that although the inner course 30 and the outer course 20 may be constructed independently and then fitted together, this is not a requirement of this invention. The two-piece description is mainly provided to aid in understanding the invention and its plethora of embodiments. In particular, embodiment 10 of this invention, as shown in FIG. 1C, may comprise of one piece alone.

Figure 2:
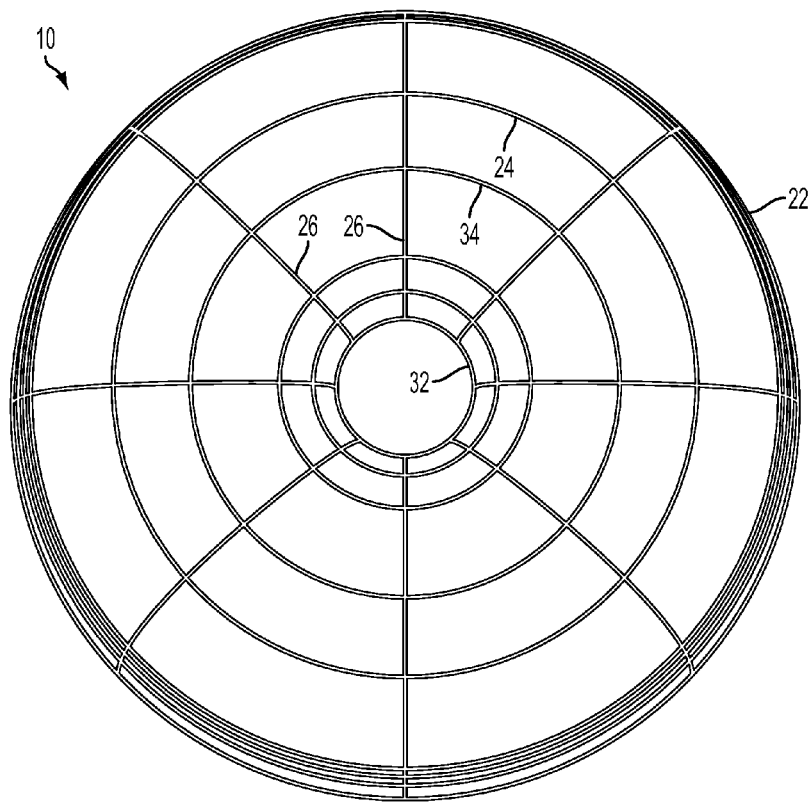
FIG. 2 is a top view of the embodiment shown in FIG. 1C showing the circular cross-sections of the two courses, all rings being substantially concentric, with successively decreasing diameters.

Referring now to FIG. 2, a top view of the embodiment 10 shown in FIG. 1C shows the vertical relationship of the two courses, all rings being substantially concentric, with successively decreasing diameters. In this embodiment, outer bottom ring 22 has the largest diameter, whereas the inner bottom ring 32 has the smallest diameter. The diameters are shown to successively decrease from the outer bottom ring 22 to the outer top ring 24, then to the inner top ring 34, all the way to the inner bottom ring 32. Spines 26 are shown to extend out radially from the imaginary center of the substantially concentric rings. In some embodiments, the rings may be stacked vertically.

In some embodiments, as depicted in FIG. 1C, the design of the plant supporting structure is a wire manufactured assembly consisting of eight wire spines spaced in a "spider leg" fashion around a four foot circle of wire. These spines, such as 26 and 28, in turn act as a welding platform for nine circular similarly gage wire rings, such as 22, 24, 32, 34 and the other intermediate rings of the inner course 30 and the outer course 20, that are welded to the spines 26 and 28. In the embodiment of FIG. 1C, the outer bottom ring 22 is the largest and is four foot in diameter. The bottom end of each spine is welded to this outer bottom ring 22 and slants inward as it rises to a height of thirty inches, where it is welded to the outer top ring 24, before curving downward toward the inner bottom ring 32. The inner bottom ring may be eight inches short of ground level. The inner bottom ring 32 may be eight inches in diameter and float eight inches above ground level. The remaining seven intermediate wire rings may vary from just under four foot to nine inches in circumference, and are placed in such a way to give structural support to plant supporting structure 10, and to give optimum plant stem support to the growing plant. As illustrated in FIG. 1C, the rings may be stacked vertically in some embodiments.

In some particular embodiments, such as shown in FIG. 1C, where the plant supporting structure is used to support a tomato plant, one to three tomato plants are set out and structure 10 is placed over the plants, with the inner bottom ring 32 centered over the plant(s). Once the tomato plant has been guided into the inner bottom ring 32, the structure supports the plant(s), providing approximately six vertical feet of support over approximately 12.5 square feet, as the plant stems grow vertically through the inner course 30, and lay naturally over a rounded top and continue back to ground level over the outer course 20.

A number of key functional improvement effects are achieved with this particular structure described above. Not only does the structure serve to keep the plant and its fruits off the ground, the structure is also sturdy and provides effective support so that that the plant is protected even in strong winds, without the need to apply strings or rope directly to tie the plant. This structure may support at least three tomato plants, keeping both the plants and the tomatoes off the ground. The design of the structure prevents running the cultivator too close to plant roots. This structure also provides excellent air circulation for the plant and helps to prevent crimped or partially broken plant stems that can prohibit natural plant fluid transfer, thereby preventing disease and decay.

Figure 3:
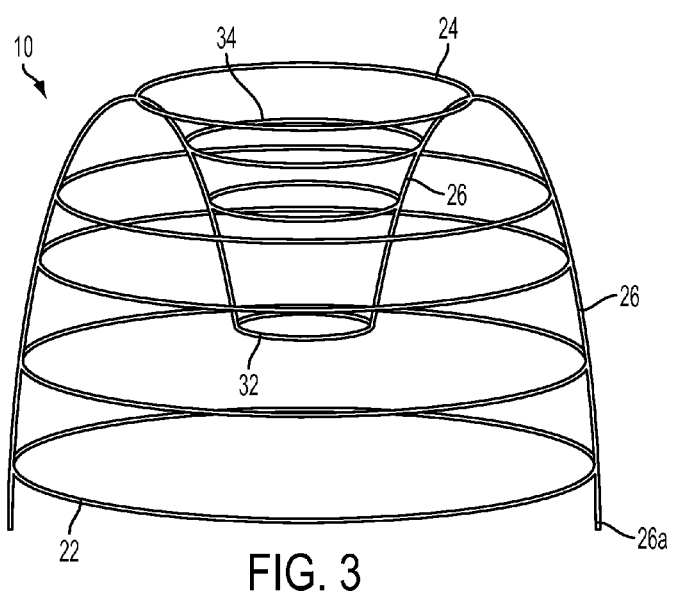
FIG. 3 is a frontal perspective view of the embodiment shown in FIG. 1C showing the spines extending beyond the largest ring to form stakes.

Referring now to FIG. 3, a frontal perspective view of an embodiment 10 of this invention is shown. This embodiment is similar to the embodiment shown in FIG. 1C, except here the spines may extend beyond the outer bottom ring 22 to form stakes that anchor the structure into the plant growing surface such as the ground. Spine 26 is shown to form an extension 26a which goes beyond the outer bottom ring 22. It may be noted that such stakes to anchor the structure 10 may be unnecessary, since the embodiment shown in FIG. 1C may be supported on the outer bottom ring 22 itself, without the addition of any anchors. If needed, weights could be temporarily placed on the bottom ring 22 without adding any stake ends.

Figure 4:
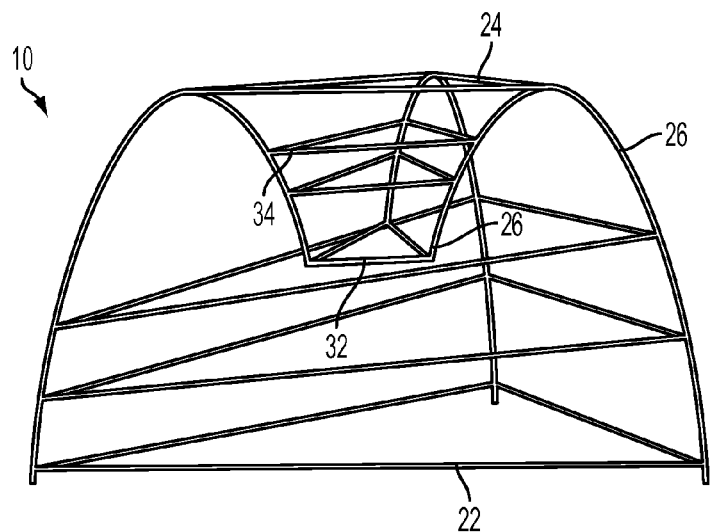
FIG. 4 is a frontal perspective view of an embodiment of the present invention showing the relative positions of the outer and inner courses, and the spines connecting all the rings in both courses, the rings being substantially triangular.

Referring now to FIG. 4, a frontal perspective view of another embodiment 10 of this invention is shown. This embodiment is similar to the embodiment shown in FIG. 1C, except here the rings have a triangular shape.

Figure 5:
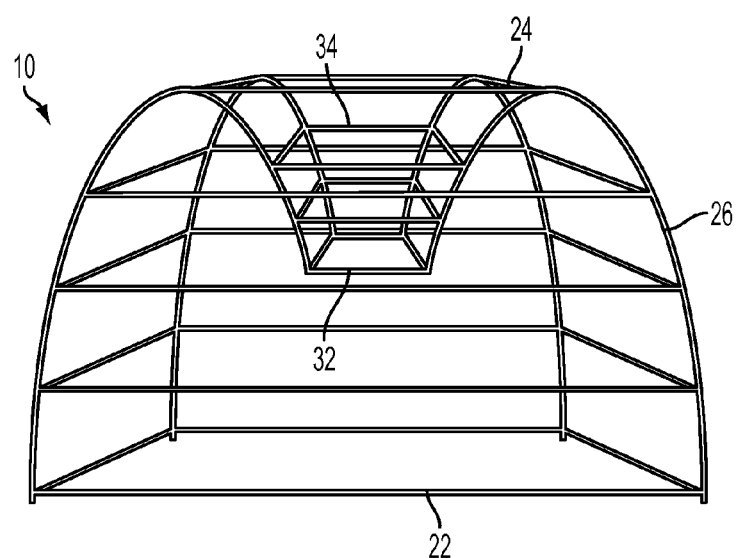
FIG. 5 is a frontal perspective view of an embodiment of the present invention showing the relative positions of the outer and inner courses, and the spines connecting all the rings in both courses, the rings being substantially triangular.

Similarly, FIG. 5 shows an embodiment where the rings have a trapezoidal cross section. It will be apparent to those skilled in the art that other cross sections may also be used for the rings. For such non-circular cross-sections, diameter of a ring will mean the largest distance between any two points on the ring. For instance, for a triangle, the diameter would be the length of the longest side, while the diameter of a quadrilateral would be the length of the longer diagonal.

Figure 6:
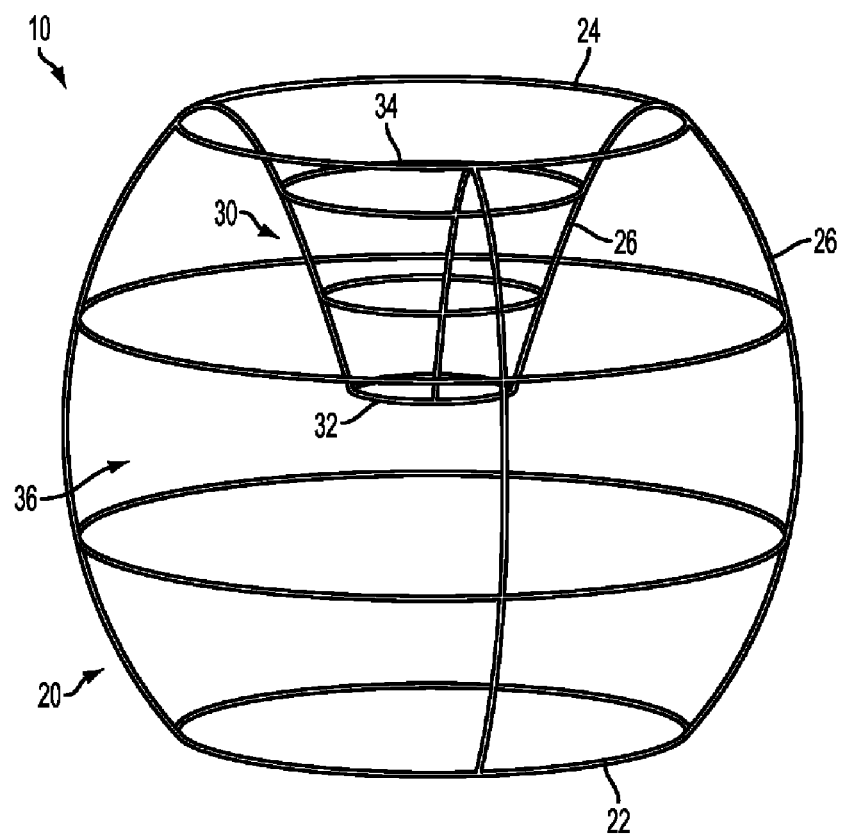
FIG. 6 is a frontal perspective view of an embodiment of the present invention where the outer course is spherical in shape.

Referring now to FIG. 6, a frontal perspective view of another embodiment is shown. Here the outer course 20 is shaped like a large sphere, and the inner course 30 is disposed within the enclosure 36 formed by the outer course 20. The diameters of the rings in the outer course 20 increase from the outer bottom ring 22 to an intermediate ring, and then decrease toward the outer top ring 24. It will be apparent to those skilled in the art that other shapes may also be used for the outer course 20 and the inner course 30. It should also be noted that since stability is an important consideration in such structures, one may need to add stakes at the bottom of the outer course 22 to properly anchor the structure. Again, as will be apparent to those skilled in the art, depending on the dimensions of the structure, an addition of stakes may well be unnecessary.

The plant supporting structures described herein may be placed on any plant growing surface, such as, but not limited to, the ground or a pot.

While many novel features have been described above, the invention is not limited to these physical embodiments. It is described and illustrated with particularity so that that those skilled in the art may understand all other embodiments that may arise due to modifications, changes in the geometry and placement of the relative components, omissions and substitutions of these embodiments that are still nonetheless within the scope of this invention.

What is claimed is:

1. A plant supporting structure, comprising:
an outer course of vertically spaced rings;
   wherein said outer course forms an enclosure;
an inner course of vertically spaced rings;
   wherein said inner course is disposed within said enclosure; and
at least two spines;
   wherein each said spine ascends vertically, successively connecting said rings from said outer course, and descends vertically thereafter, successively connecting said rings from said inner course.

2. The plant supporting structure of claim 1, wherein:
said outer course further comprises:
   an outer bottom ring and an outer top ring, wherein the diameters of said rings in said outer course decrease successively from said outer bottom ring to said outer top ring;
said inner course further comprises:
   an inner bottom ring and an inner top ring, wherein the diameters of said rings in said inner course decreasing successively from said inner top ring to said inner bottom ring.

3. The plant supporting structure of claim 2, wherein:
said outer bottom ring is lower than said inner bottom ring.

4. The plant supporting structure of claim 3, wherein:
said spines extend beyond said outer bottom ring,
said spines being able to anchor said structure into a plant growing surface.

5. The plant supporting structure of claim 1, wherein:
said rings are substantially circular, and
said rings are substantially concentric.

6. The plant supporting structure of claim 1, wherein:
said rings are trapezoidal.

7. The plant supporting structure of claim 1, wherein:
said rings are triangular.

* * * * *